(12) United States Patent  
Merensky (10) Patent No.: US 8,931,846 B2  
(45) Date of Patent: Jan. 13, 2015

(54) SEAT FOR TRANSPORT VEHICLE

(75) Inventor: Harald Merensky, Hamburg (DE)

(73) Assignee: Lufthansa Technik AG, Hamburg (DE)

( * ) Notice: Subject to any disclaimer, the term of this patent is extended or adjusted under 35 U.S.C. 154(b) by 971 days.

(21) Appl. No.: 12/680,525

(22) PCT Filed: Oct. 2, 2008

(86) PCT No.: PCT/EP2008/008376
§ 371 (c)(1),
(2), (4) Date: Oct. 25, 2010

(87) PCT Pub. No.: WO2009/046938
PCT Pub. Date: Apr. 16, 2009

(65) Prior Publication Data
US 2012/0025571 A1     Feb. 2, 2012

(30) Foreign Application Priority Data
Oct. 5, 2007  (DE) .................. 10 2007 047 651

(51) Int. Cl.
*B60N 2/46* (2006.01)
*B64D 11/06* (2006.01)
(52) U.S. Cl.
CPC ........ *B64D 11/06* (2013.01); *B64D 2011/0613* (2013.01); *B64D 2011/0624* (2013.01)
USPC ............. 297/411.3; 297/411.32; 297/411.35; 297/411.37; 297/311; 297/233; 297/248; 297/118; 297/423.19; 297/337
(58) Field of Classification Search
CPC ............. B64D 11/0693; B60N 2/4626; B60N 2/4686; B60N 2002/0212
USPC ............... 297/411.3, 411.32, 411.35, 411.37, 297/423.19, 423.2, 423.22, 423.23, 423.24, 297/423.28, 337, 311, 312, 350, 423.38, 297/233, 248, 249, 118
See application file for complete search history.

(56) References Cited

U.S. PATENT DOCUMENTS 1,361,446 A * 12/1920 Conner et al. ................ 297/343
1,500,524 A *  7/1924 Phillips .................... 297/411.34
(Continued)

FOREIGN PATENT DOCUMENTS

DE      198 09 426      9/1999
DE       19809426       9/1999
(Continued)

OTHER PUBLICATIONS

IPRP and Written Opinion dated May 11, 2010, directed to counterpart International Application No. PCT/EP2008/008376; 9 pages.

(Continued)

*Primary Examiner* — Laurie Cranmer
(74) *Attorney, Agent, or Firm* — Morrison & Foerster LLP (57) ABSTRACT

A seat for a transport vehicle includes a seat surface, an armrest, and a child armrest. The child armrest is configured to adopt an adult position and a child position. In the adult position the child armrest is arranged in a stowed position in which the child armrest is incorporated in a contour of the armrest. In the child position the child armrest is arranged in a use position in which the child armrest has a reduced spacing from the seat surface in the vertical direction and a reduced spacing from an opposing armrest in the horizontal direction.

12 Claims, 7 Drawing Sheets

(56) References Cited

U.S. PATENT DOCUMENTS

| | | | | |
|---|---|---|---|---|
| 1,546,220 A | * | 7/1925 | Eriksen | 297/338 |
| 1,802,620 A | * | 4/1931 | Scully | 297/113 |
| 1,828,470 A | * | 10/1931 | Monnot | 297/423.18 |
| 2,897,000 A | | 7/1959 | Hart et al. | |
| 3,632,161 A | * | 1/1972 | Arfaras et al. | 297/145 |
| 3,893,729 A | * | 7/1975 | Sherman et al. | 297/118 |
| 3,926,473 A | * | 12/1975 | Hogan | 297/115 |
| 4,019,779 A | * | 4/1977 | Hogan | 297/411.24 |
| 4,819,987 A | * | 4/1989 | Stringer | 297/423.35 |
| 5,193,765 A | * | 3/1993 | Simpson et al. | 244/118.6 |
| 5,447,359 A | * | 9/1995 | Asbjornsen et al. | 297/423.35 |
| 6,547,323 B1 | * | 4/2003 | Aitken et al. | 297/113 |
| 6,758,520 B2 | * | 7/2004 | Pehrson | 297/216.1 |
| 6,824,220 B1 | * | 11/2004 | Davison | 297/440.14 |
| 6,866,341 B2 | * | 3/2005 | Behnert | 297/423.26 |
| 7,384,092 B2 | * | 6/2008 | Hodges | 296/153 |
| 7,445,291 B2 | * | 11/2008 | Parkel et al. | 297/423.1 |
| 7,506,930 B2 | * | 3/2009 | Penley et al. | 297/284.11 |
| 7,600,817 B2 | * | 10/2009 | Kramer et al. | 297/362.13 |
| 7,712,831 B2 | * | 5/2010 | Abt et al. | 297/257 |
| 8,016,355 B2 | * | 9/2011 | Ito et al. | 297/337 |
| 8,186,760 B2 | * | 5/2012 | Kneller et al. | 297/411.32 |
| D665,182 S | * | 8/2012 | Hilton et al. | D6/360 |
| 2002/0195868 A1 | | 12/2002 | Tsai | |
| 2004/0046430 A1 | * | 3/2004 | Plant et al. | 297/248 |
| 2005/0194828 A1 | * | 9/2005 | Johnson et al. | 297/411.32 |
| 2006/0055228 A1 | | 3/2006 | Tsai | |
| 2010/0045086 A1 | * | 2/2010 | Merensky | 297/255 |

FOREIGN PATENT DOCUMENTS

| | | |
|---|---|---|
| DE | 201 11 970 | 10/2001 |
| DE | 20111970 | 10/2001 |
| GB | 793883 | 4/1958 |

OTHER PUBLICATIONS

International Search Report dated Mar. 3, 2009, directed at counterpart International Application No. PCT/EP2008/008376; 6 pages.

* cited by examiner

SEAT FOR TRANSPORT VEHICLE

REFERENCE TO RELATED APPLICATIONS

This application is a national stage application under 35 USC 371 of International Application No. PCT/EP2008/008376, filed Oct. 2, 2008, which claims the priority of German Patent Application No. 10 2007 047 651.7-16, filed Oct. 5, 2007, the contents of which prior applications are incorporated herein by reference.

FIELD OF THE INVENTION

The invention relates to a seat for a transport vehicle, in particular for an aircraft. The seat, which comprises a seat surface, an armrest and a child armrest in addition to the armrest, may adopt an adult position and a child position. In the adult position the child armrest is arranged in a stowed position and in the child position said armrest is arranged in a use position. In the use position, the child armrest has a reduced spacing from the seat surface in the vertical direction and a reduced spacing from an opposing armrest in the horizontal direction. In the adult position, an adult may be seated comfortably on the seat, and in the child position the seat is intended for a child.

BACKGROUND OF THE INVENTION

A seat is disclosed in US 2006/0055228 A1, in which U-shaped frames of various sizes may be folded out of the backrest. A seat is disclosed in DE 201 11 970 U1, in which a U-shaped frame may be pivoted out of the armrest such that it extends transversely to the armrest.

Seats are further known which in the child position are intended to transport a small child up to two years old in a reboard seat. In the child position, the reboard seat is moved into position so that the small child may be accommodated in the reboard seat counter to the normal seating direction. Reboard seats of this type are only suitable for small children. Children who are more than two years old may not be accommodated in a reboard seat.

SUMMARY OF THE INVENTION

The object of the invention is to propose a seat of the aforementioned type which, in the child position, is suitable for children over two years old. The object is achieved by the features broadly disclosed herein. Advantageous embodiments are set forth in the disclosure.

According to the invention, in the stowed position the child armrest is incorporated in the contour of the armrest.

Firstly, several terms will be explained. A seat comprises a child armrest in addition to an armrest, when the arm support surface of the child armrest is different from the arm support surface of the armrest. The child armrest is incorporated in the contour of the armrest, when the child armrest does not protrude in the lateral direction substantially over the arm support surface of the armrest. Two armrests oppose one another, when the seat surface of the seat is arranged between the armrests.

The reduced spacing of the child armrest in the use position relative to the seat surface and the opposing armrest is in each case reduced in comparison with the arm support surface of the armrest. By the reduced spacing from the seat surface and the opposing armrest, children may comfortably rest their arms on the arm support surface of the child armrest.

An individual armrest is not sufficient for comfortable seating, but instead an armrest should be arranged on each side of the seat. This may be achieved by a plurality of seats, which, taken individually, have only one armrest, being positioned adjacent to one another such that the armrest in each case may be used from two adjacent seats. It is more comfortable, however, if each seat has its own armrests on both sides, in other words if it comprises two armrests and two child armrests.

In the use position, the arm support surface of the child armrest is aligned substantially horizontally, so that a child may rest its arms from above on the arm support surface. Different mechanisms are considered for changing the child armrest from the use position to the stowed position. Thus it is possible to insert the child armrest into the armrest along guide surfaces, the alignment of the child armrest being substantially maintained. So that the child armrest may be incorporated in this manner into the contour of the armrest it is, however, necessary that the armrest has a sufficient width. In particular, in armrests of narrow width, the child armrest may also be arranged so that the arm support surface is arranged substantially vertically in the stowed position. For alternating between the stowed position and the use position, the child armrest may then be pivoted about an axis parallel to the armrest. Preferably, the child armrest is pivoted upwards from the use position into the stowed position, so that the arm support surface of the child armrest is arranged in the stowed position in the inside of the armrest. The underside of the child armrest opposing the arm support surface may be designed so that, in visual terms, it is perfectly integrated into the armrest in the stowed position. Also included in the invention are combinations of pivoting and sliding mechanisms.

A retaining device may be provided which holds the child armrest securely in the stowed position when the transport vehicle is subjected to turbulence. The retaining device may include a mechanism in which, for example, an element connected to the child armrest engages in an undercut of the armrest. In an advantageous embodiment, a magnet cooperating with a metal element is provided in order to hold the child armrest in the stowed position. Such a closure is virtually free from wear. In order to release the child armrest from the stowed position, the magnetic force has to be overcome. Additionally, a handle may be provided on the child armrest, on which the operator may directly act in the stowed position. It is visually more attractive, however, if in the stowed position the child armrest is inserted into the armrest with as flat a surface as possible. In order to be able to release the magnets, however, it may be provided that the child armrest is moved initially into the intermediate position between the stowed position and the use position, so that the child armrest may be grasped from behind. To alternate between the stowed position and the intermediate position, a mechanism may be provided which is actuated in both directions of movement by pressure on the underside of the child armrest.

The seating comfort for the child may be further improved if the length of the seat surface is able to be adapted to the size of the child. The length of the seat surface relates to the direction along which the upper legs are aligned in the normal seating position. The length of the seat surface may be adjusted with a fixed size of the seat cushion by the seat cushion being displaced relative to the backrest of the seat.

It is also possible for a rear segment of the seat surface to be arranged in a fixed position relative to the backrest. The seat surface comprises, therefore, further segments, the segments being able to be moved relative to one another so that as a result the length of the seat surface is altered. For example, the segments may be displaced relative to one another in the plane of the seat surface. It is also possible for a segment to be able to be pivoted about an axis aligned transversely to the seat surface away from the plane of the seat surface. In order to permit adjustment of the length of the seat surface in a plurality of steps, a plurality of segments may be provided which may be pivoted individually or together away from the plane of the seat surface.

The vertical spacing between the seat surface and the floor is dimensioned so that an adult may place his or her feet comfortably on the floor. For the child position, a foot support may be provided, which has a smaller vertical spacing from the seat surface. The vertical spacing between the seat surface and the foot support may be adjusted. In order to be able to adapt the foot support to different lengths of the seat surface, the position of the foot support may be adjusted in the horizontal direction. The possibility of adjustment in the vertical and horizontal direction may be carried out either independently or linked together. In the adult position, the foot support is arranged so that the adult is not hindered if his or her feet are placed in front of the seat surface on the floor.

The seat according to the invention may, for example, be used in aircraft, buses or trains.

So that the child may be looked after during the journey, it is advantageous if a seat according to the invention is arranged adjacent to a conventional seat intended for adults. On the other side of the conventional seat, a third seat may be arranged which is designed to alternate between an adult position and a child position. The two outer seats may be moved into the child position. An adult sitting in the middle may look after two children accommodated on the outer seats. The third seat may also be a seat according to the invention. The third seat may, however, also be a seat which in the child position provides a reboard seat for small children under two years old. Such a seating arrangement is designed for the frequent case where an adult undertakes a journey together with two children.

In larger aircraft, the seats are frequently arranged in groups of four, such groups of four being readily taken up by two parents and two children. For this target group, it is advantageous if the group of four comprises two seats which may adopt a child position in addition to an adult position. The seats for the parents may be arranged between the seats for the children, but other arrangements are also possible.

BRIEF DESCRIPTION OF THE DRAWINGS

The invention is described hereinafter with reference to the accompanying drawings with reference to an advantageous embodiment by way of example, in which.

DETAILED DESCRIPTION OF THE INVENTION

Figure 1:
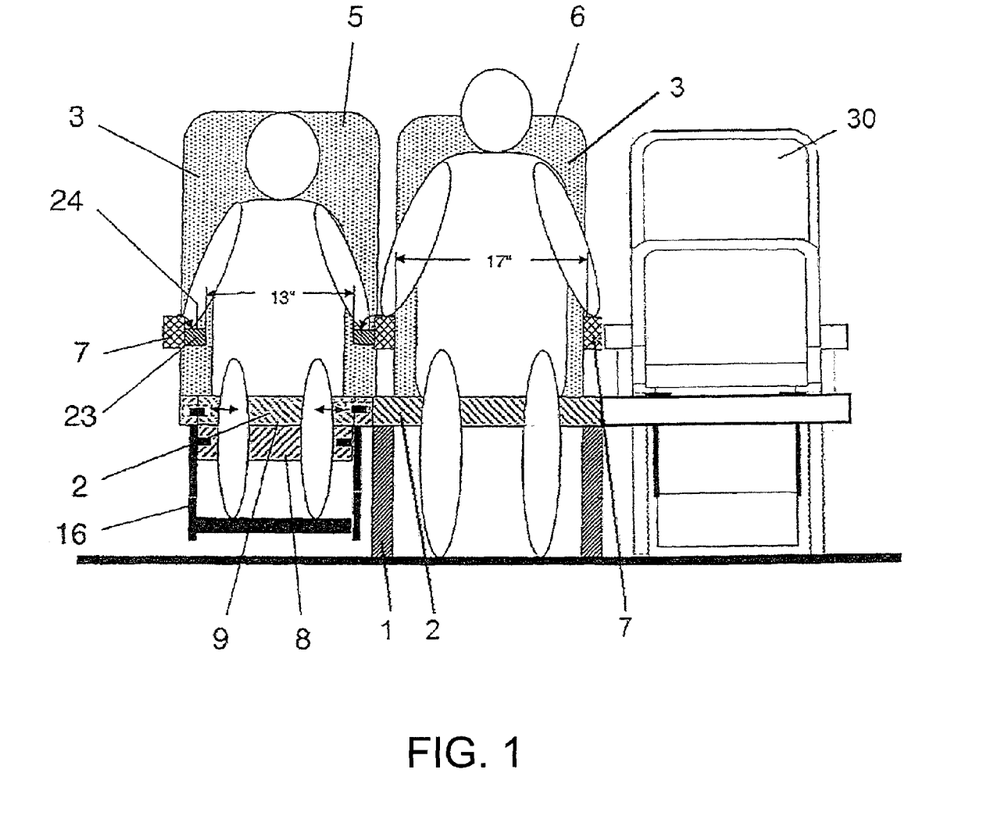
FIG. 1 shows a seating arrangement comprising a seat according to the invention, a conventional seat and a reboard seat.

The seats 5, 6, 30 shown in FIG. 1, have a basic frame indicated at 1, by which they are fastened to the floor of an aircraft cabin. The seats comprise in each case a seat surface 2 and a backrest 3. The backrests 3 are able to be adjusted in inclination relative to the seat surfaces 2 in the known manner. The seat 6 is a conventional seat which is dimensioned so that an adult may sit comfortably thereon. The seat 5 is a seat according to the invention in the child position. The seat 30 is a seat which in the child position provides a reboard seat.

The seat 5 comprises in each case an armrest 7 and a child armrest 23 on both sides. The child sitting on the seat 5 has its arms resting on the arm support surfaces 24 of the child armrests 7. The feet of the child rest on a foot support 16. The seat surface 2 of the seat 5 is shortened, so that it is adapted to the upper leg length of the child. In order to move the seat 5 into the adult position, the child armrests 23 are pivoted upwards so that they are incorporated into the contour of the armrests 7, the foot supports 16 are pivoted to the rear and the seat surface 2 is lengthened to its full length.

Figure 2:
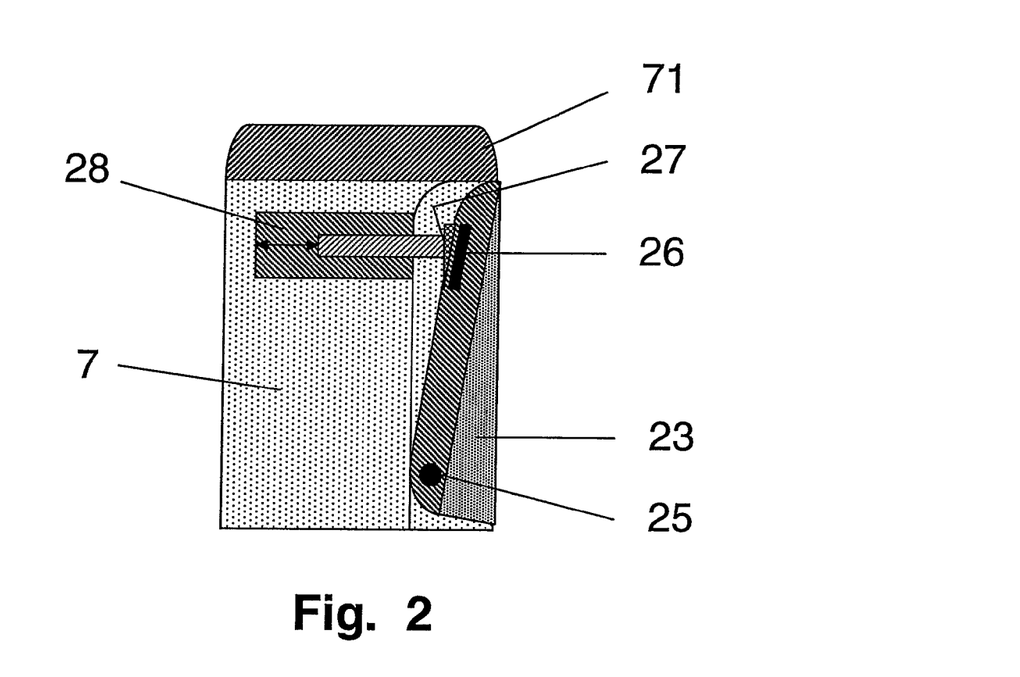
FIG. 2 shows an armrest comprising a child armrest in the stowed position.
Figure 3:
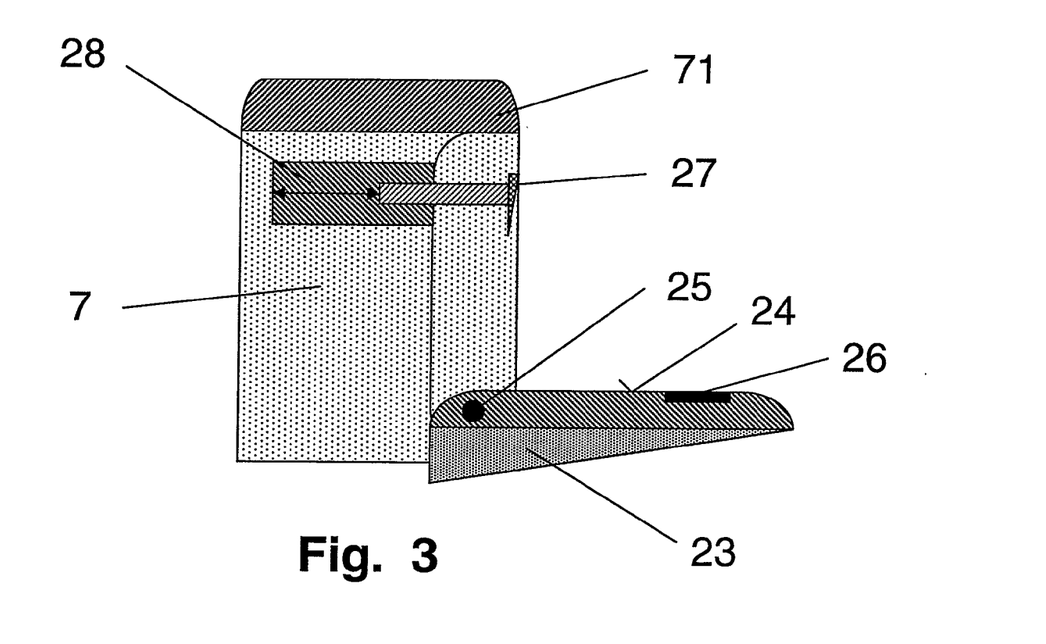
FIG. 3 shows an armrest comprising a child armrest in the use position.
Figure 4:
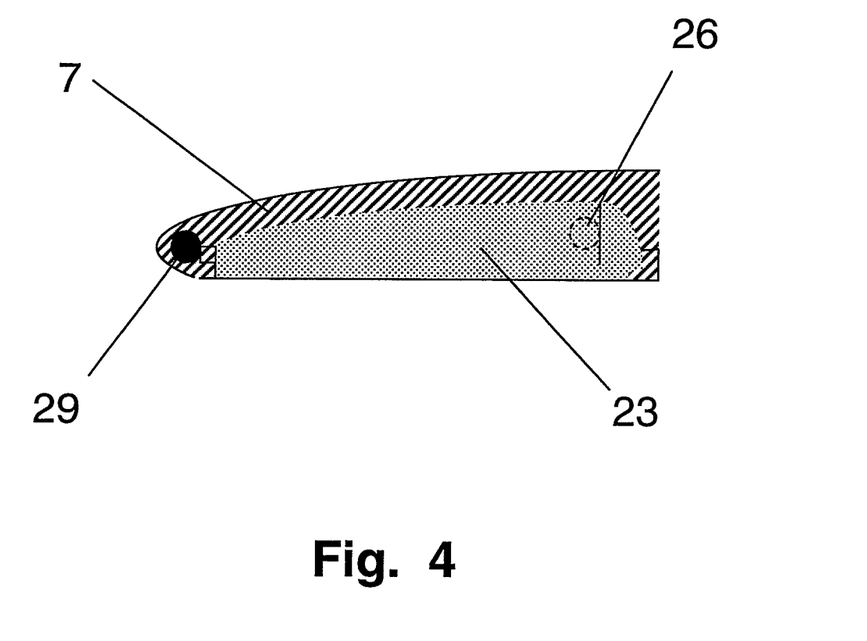
FIG. 4 shows the armrest of FIG. 2 in a side view.

In the stowed position, the child armrest 23 according to FIG. 2 is incorporated in the contour of the armrest 7. The child armrest 23 does not substantially protrude, therefore, laterally beyond the arm support surface 71 of the armrest 7. The child armrest 23 is pivoted about an axis 25 in order to move it into the use position shown in FIG. 3, in which the child may rest his or her arms on the arm support surface 24.

The child armrest 23 is held by a magnet 26 which cooperates with a metal part 27 in the stowed position. The metal part 27 is attached to a mechanism 28, which may adopt two positions. In the position shown in FIG. 2, the mechanism 28 holds the child armrest 23 so that it terminates flush with the armrest 7. In the position shown in FIG. 3, the mechanism holds the child armrest 23 in an intermediate position, so that it may be grasped from behind in order to release the magnet 26 from the metal part 27. In order to move the mechanism from one position into the other position, in each case a pressure pulse is exerted on the metal part 27 via the child armrest 23. Via the actuating knob 29, the inclination of the backrest 3 of the seat 5 may be altered.

Figure 5:
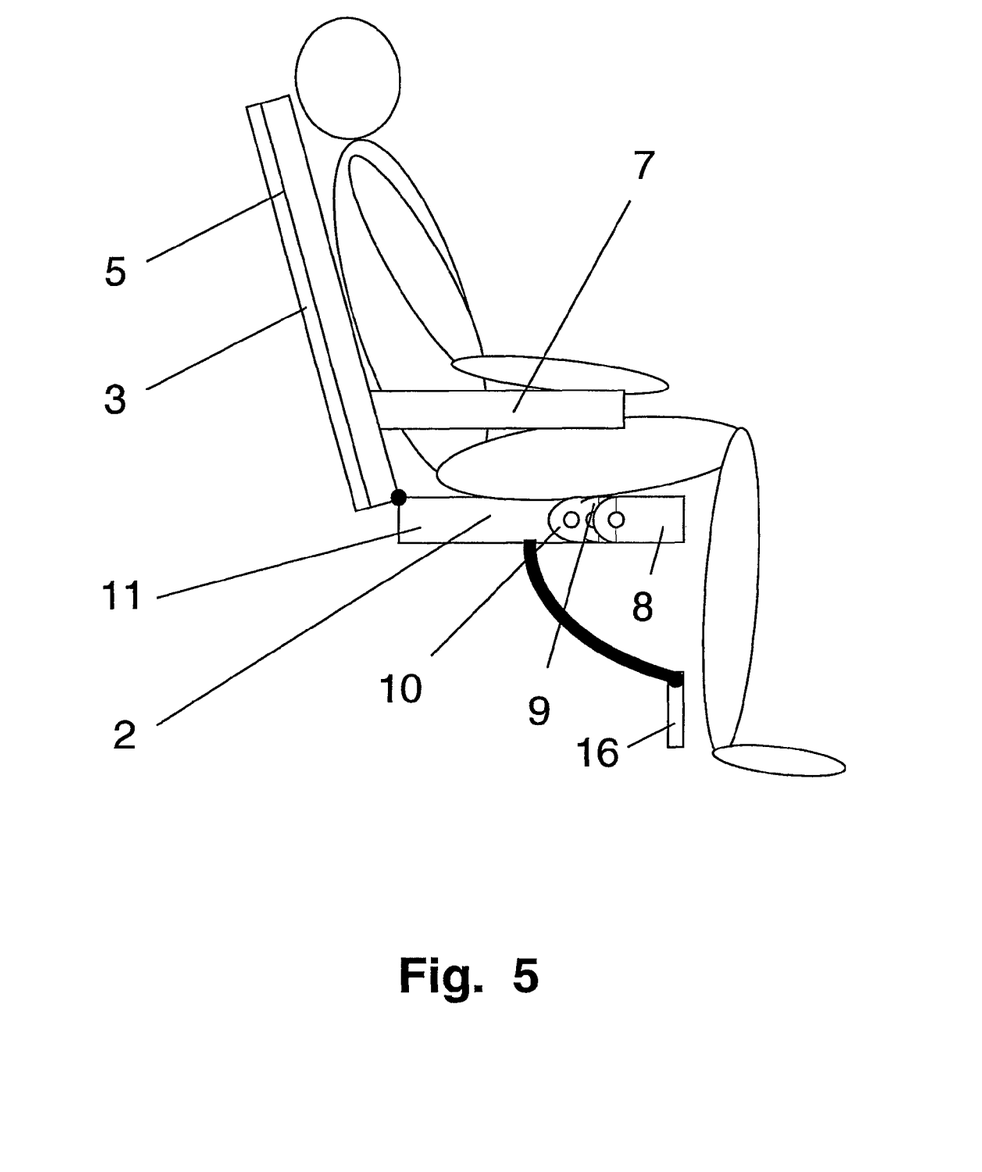
FIG. 5 shows a seat according to the invention in the adult position.
Figure 6:
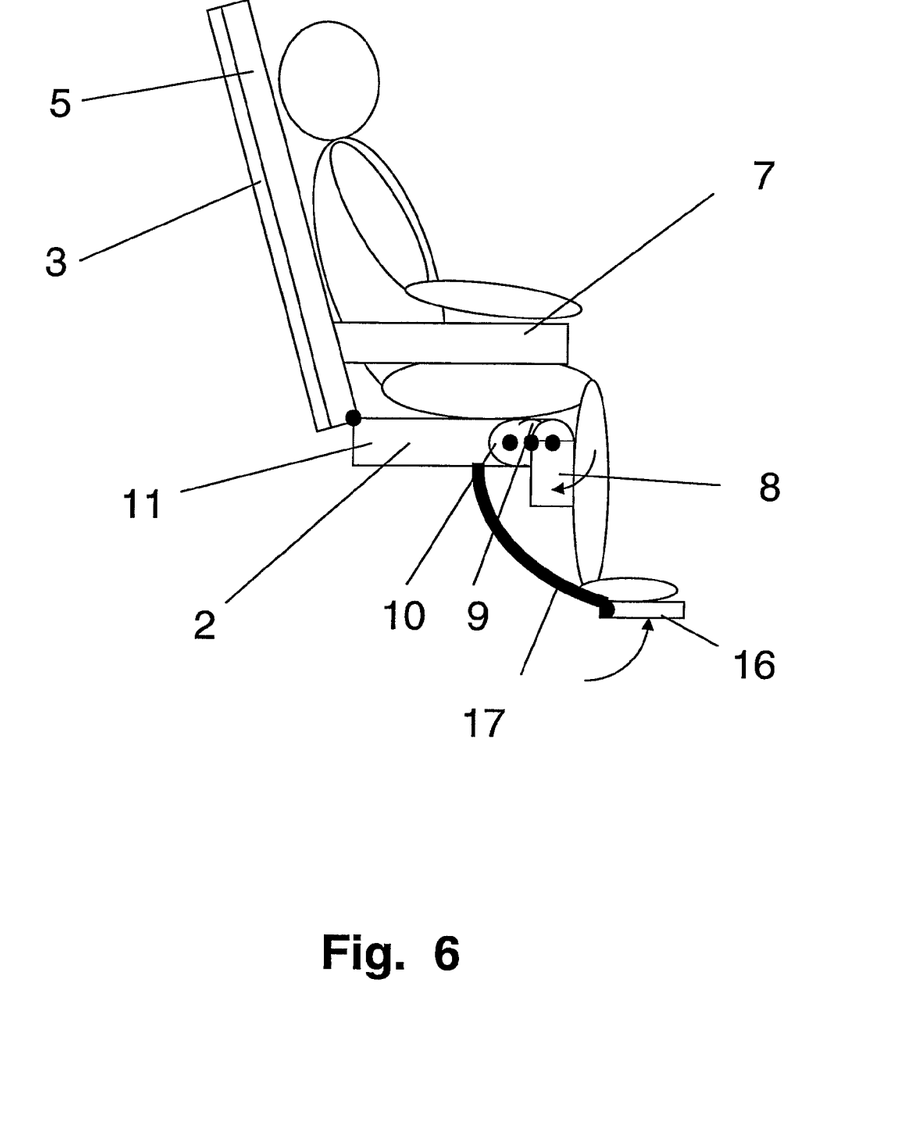
FIGS. 6-8 show the seat of FIG. 5 in various child positions.
Figure 7:
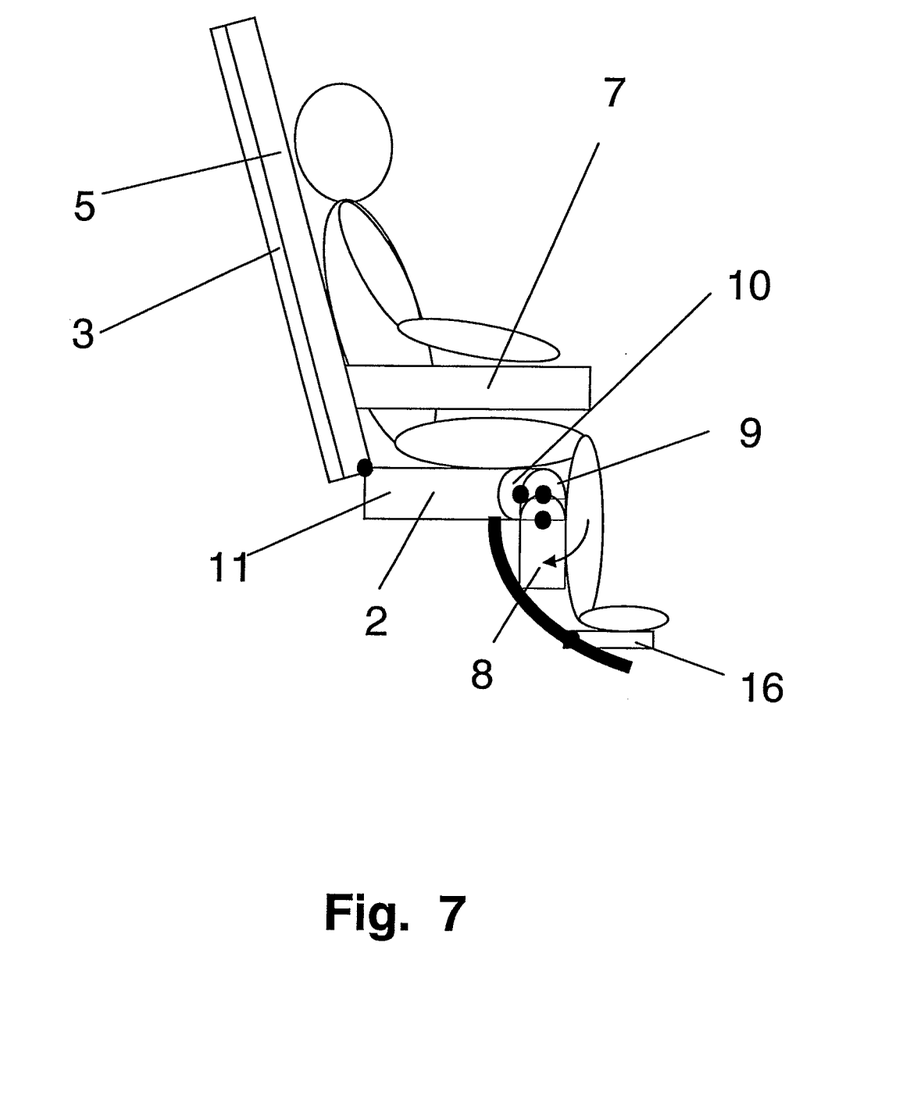
Figure 8:
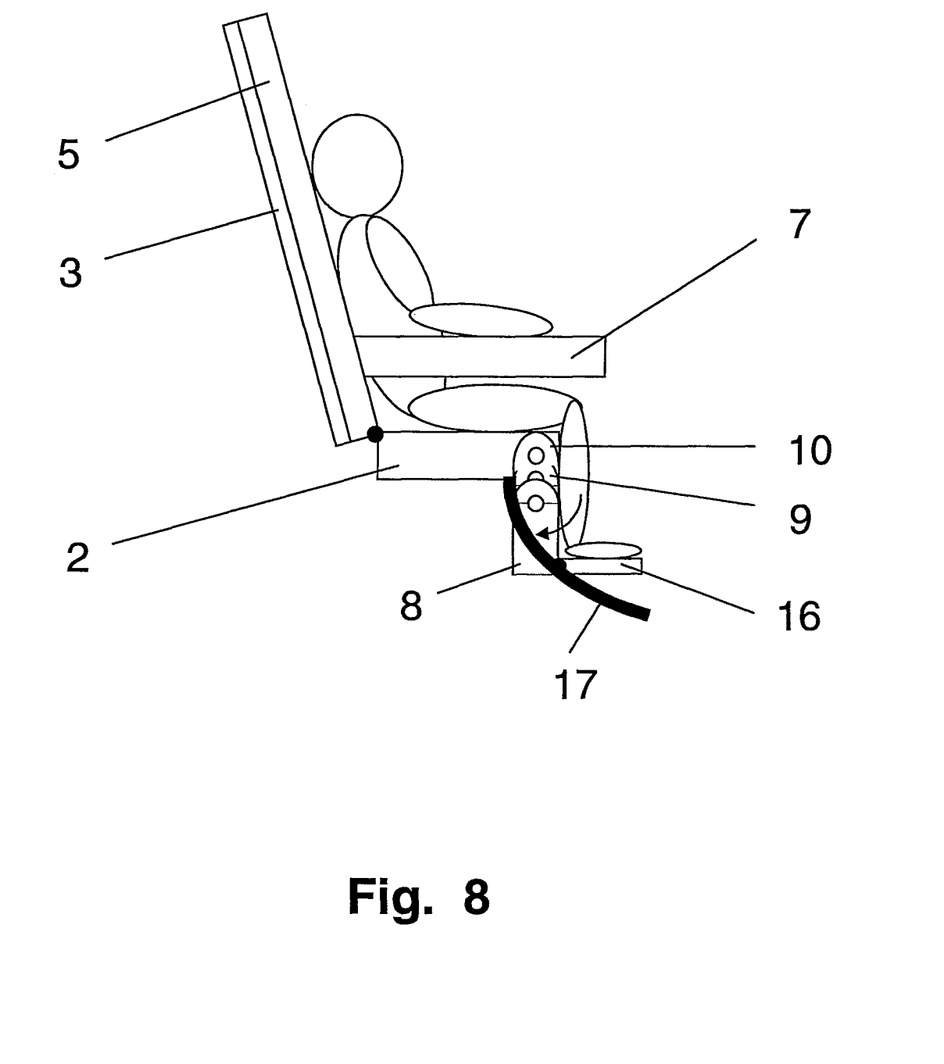

FIG. 5 shows the seat 5 according to the invention in the adult position. The seat surface 2 is fully extended and the foot support 16 is pivoted to the rear. An adult of a height of 1.75 m is seated on the seat 5. In FIGS. 6 to 8, the seat 5 is shown in various child positions. In FIG. 6 the seat 5 is designed for a child of a height of 1.16 m, in FIG. 7 for a child of a height of 1.04 m and in FIG. 8 for a child of a height of 0.92 m. The sizes are statistically the average sizes for children of six, four and two years old.

The seat surface 2 comprises three movable segments 8, 9, 10, which may be pivoted downwards individually or in groups. By means of the segments 8, 9, 10, the length of the seat surface 2 may be adjusted in a plurality of steps. A rear segment 11 of the seat surface 2 is arranged in a fixed position relative to the backrest 3.

The foot support 16 is guided in curved guide rails 17, and may be locked in position in various positions in the guide rails 17, the position of the foot support 16 being altered both in the horizontal and in the vertical direction. By the curvature of the guide rails 17, the vertical position of the foot support 16 is linked with the horizontal position. In the adult position, the foot support 16 is pivoted to the rear so that the adult may place his or her feet unhindered on the floor.

The invention claimed is:
1. A seat for a transport vehicle comprising:
a frame configured to be fastened to the floor of the transport vehicle;
a seat surface;
an armrest comprising an adult arm support surface;

a child armrest comprising a child arm support surface different from the adult arm support surface, the child armrest configured to adopt an adult position and a child position, wherein in the adult position the child armrest is arranged in a stowed position in which the child armrest is incorporated in a contour of the armrest, and wherein in the child position the child armrest is arranged in a use position in which the child armrest has a reduced spacing from the seat surface in the vertical direction and a reduced spacing from an opposing armrest in the horizontal direction;

a second armrest; and a second child armrest.

2. The seat of claim 1, wherein the child arm support surface is arranged substantially vertically in the stowed position.

3. The seat of claim 1, wherein the child armrest is configured to alternate between the stowed position and the use position by pivoting about an axis parallel to the armrest.

4. The seat of claim 1, further comprising a magnet configured to cooperate with a metal element in order to hold the child armrest in the stowed position.

5. The seat of claim 4, wherein the magnet and the metal element are configured to release from each other once the child armrest is moved into an intermediate position between the stowed position and the use position.

6. The seat of claim 1, wherein a length of the seat surface may be adjusted.

7. The seat of claim 6, wherein the seat surface comprises a plurality of segments, each segment configured to move relative to one another.

8. The seat of claim 7, wherein a segment of the plurality of segments is configured to pivot about an axis aligned transversely to the seat surface.

9. The seat of claim 1, further comprising a foot support, wherein spacing between the seat surface and the foot support is adjustable in the vertical direction.

10. The seat of claim 9, wherein the foot support is adjustable in the horizontal direction.

11. A seating arrangement comprising:

a first seat configured according to claim 1; and a second seat arranged to a side adjacent to the first seat and comprising an adult seat for a transport vehicle.

12. The seating arrangement of claim 11, comprising a third seat that comprises a reboard seat, wherein the second seat is arranged between the first seat and the third seat in the lateral direction.

* * * * *